United States Patent
Raggam et al.

(10) Patent No.: US 9,444,616 B2
(45) Date of Patent: Sep. 13, 2016

(54) TRANSPONDER UNIT, SYSTEM AND METHOD FOR CONTACTLESS DATA TRANSMISSION

(71) Applicant: Infineon Technologies AG, Neubiberg (DE)

(72) Inventors: Peter Raggam, St. Stefan im Rosental (AT); Josef Gruber, St. Ruprecht an der Raab (AT); Martin Buchsbaum, Graz (AT)

(73) Assignee: INFINEON TECHNOLOGIES AG, Neubiberg (DE)

(*) Notice: Subject to any disclaimer, the term of this patent is extended or adjusted under 35 U.S.C. 154(b) by 1 day.

(21) Appl. No.: 14/279,365

(22) Filed: May 16, 2014

(65) Prior Publication Data
US 2014/0341327 A1 Nov. 20, 2014

(30) Foreign Application Priority Data
May 16, 2013 (DE) .......... 10 2013 008 516

(51) Int. Cl.
| | |
|---|---|
| *H04K 1/10* | (2006.01) |
| *H04W 4/00* | (2009.01) |
| *H04L 7/033* | (2006.01) |
| *H04L 12/701* | (2013.01) |
| *H04B 5/02* | (2006.01) |
| *G06K 19/07* | (2006.01) |

(52) U.S. Cl.
CPC .......... *H04L 7/0331* (2013.01); *G06K 19/0723* (2013.01); *H04B 5/02* (2013.01); *H04L 45/00* (2013.01)

(58) Field of Classification Search
CPC . H04L 7/0087; H04L 7/0058; H04L 7/0337; H04L 27/12; H04L 27/2656; H04L 27/2659
USPC .......................................... 375/260; 370/331
See application file for complete search history.

(56) References Cited

U.S. PATENT DOCUMENTS

| | | | | | |
|---|---|---|---|---|---|
| 4,241,237 | A | * | 12/1980 | Paraskevakos | ...... H04M 11/002 340/870.02 |
| 5,446,452 | A | * | 8/1995 | Litton | ...... B61K 9/04 246/159 |

(Continued)

FOREIGN PATENT DOCUMENTS

| | | |
|---|---|---|
| DE | 102011119687 A1 | 5/2013 |
| EP | 1763820 B1 | 3/2007 |

OTHER PUBLICATIONS

German Office Action dated Nov. 14, 2013 received for the parallel German application 102013008516.0.

*Primary Examiner* — Daniel Washburn
*Assistant Examiner* — Sarah Hassan (57) ABSTRACT

A transponder unit for the contactless transmission of modulated data to a reader is provided. The transponder unit includes a clock generator configured to generate a clock signal and to synchronize the clock signal in a synchronization mode, on the basis of a signal received from the reader, and a modulator, the modulator configured to modulate data on the basis of the clock signal from the clock generator. The modulator is configured to generate a modulation pause by masking out at least one modulation component, the modulation component being smaller than a modulation pulse. The modulator is further configured to send the signal for starting the synchronization mode to the clock generator during this modulation pause.

16 Claims, 7 Drawing Sheets

(56) References Cited

U.S. PATENT DOCUMENTS

| | | | |
|---|---|---|---|
| 7,653,394 B2 * | 1/2010 | McMillin | H04L 45/00 370/331 |
| 2003/0101526 A1 * | 6/2003 | Hilscher | A61C 17/22 15/22.1 |
| 2004/0036626 A1 * | 2/2004 | Chan | A01K 11/006 340/870.17 |
| 2005/0030935 A1 * | 2/2005 | Seisenberger | H04L 7/06 370/350 |
| 2005/0212661 A1 * | 9/2005 | Friedrich | 340/10.5 |
| 2006/0097250 A1 * | 5/2006 | Koyama | B82Y 10/00 257/40 |
| 2009/0040022 A1 * | 2/2009 | Finkenzeller | 340/10.1 |
| 2013/0135085 A1 | 5/2013 | Buchsbaum et al. | |

* cited by examiner

TRANSPONDER UNIT, SYSTEM AND METHOD FOR CONTACTLESS DATA TRANSMISSION

CROSS-REFERENCE TO RELATED APPLICATION

This application claims priority to German Patent Application Serial No. 10 2013 008 516.0, which was filed May 16, 2013, and is incorporated herein by reference in its entirety.

TECHNICAL FIELD

Various embodiments relate generally to a transponder unit, to a system and to a method for contactless data transmission. Transponder units, also called transponders, are used in chip cards, tags and appliances for mobile data transmission, for example. Together with a reader, transponders form a system for contactless data transmission.

BACKGROUND

A distinction is made between passive and active transponders. In the case of a passive transponder, the supply of power and the data interchange between the transponder and the reader are effected using magnetic or electromagnetic fields. In this case, the transponder uses an antenna to pick up the power required for operation from the field of the reader. In contrast to this, the active transponder has its own power source, for example a battery. The active transponder can modulate either passively using load modulation or actively using a driver stage.

For the contactless data transmission between a transponder and a reader, it is important to observe a precise clock. In conventional systems, for example based on the ISO/IEC 14443 communication standard, with a passive transponder, the clock (in the ISO/IEC 14443 communication standard: 13.56 MHz) for operating the transponder both in the transmission mode and in the reception mode is derived from the clock of the reader. The transmission mode is usually effected by means of load modulation, this type of modulation allowing the clock to be derived easily.

If such a clock signal is not available to the transponder in the transmission Mode-which may be the case with active transponders, for example-then the transponder requires its own clock generator.

A conventional transponder may have its own oscillator. In this case, the oscillator is coupled to the signal received from the reader in a phase-locked manner by means of a phase-locked loop (PLL) circuit when the transponder unit is in the reception mode. When the transponder unit is in the transmission mode, that is to say during data transmission from the transponder unit to the reader, the control voltage from the PLL circuit is kept constant. Clock synchronization between the reader and the transponder unit does not take place during this time. An attempt is merely made to keep the frequency of the oscillator as stable as possible. Particularly when transmission times in the transponder unit are relatively long, this can result in clock discrepancies and hence in a disturbance in the data transmission.

SUMMARY

A transponder unit for the contactless transmission of modulated data to a reader is provided. The transponder unit includes a clock generator configured to generate a clock signal and to synchronize the clock signal in a synchronization mode, on the basis of a signal received from the reader, and a modulator, the modulator configured to modulate data on the basis of the clock signal from the clock generator. The modulator is configured to generate a modulation pause by masking out at least one modulation component, the modulation component being smaller than a modulation pulse. The modulator is further configured to send the signal for starting the synchronization mode to the clock generator during this modulation pause.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various embodiments of the invention are described with reference to the following drawings, in which.

DESCRIPTION

The following detailed description refers to the accompanying drawings that show, by way of illustration, specific details and embodiments in which the invention may be practiced.

The word "exemplary" is used herein to mean "serving as an example, instance, or illustration". Any embodiment or design described herein as "exemplary" is not necessarily to be construed as preferred or advantageous over other embodiments or designs.

The word "over" used with regards to a deposited material formed "over" a side or surface, may be used herein to mean that the deposited material may be formed "directly on", e.g. in direct contact with, the implied side or surface. The word "over" used with regards to a deposited material formed "over" a side or surface, may be used herein to mean that the deposited material may be formed "indirectly on" the implied side or surface with one or more additional layers being arranged between the implied side or surface and the deposited material, Various embodiments provide a transponder unit, a system and a method for contactless data transmission which provides a stable and precise clock signal when the transponder unit is in the transmission mode. In other words, this means that the clock frequency provided and used is essentially constant.

The transponder unit according to various embodiments for the contactless transmission of modulated data to a reader has a clock generator for generating a clock signal and for synchronizing the clock signal in a synchronization mode, on the basis of a signal received from the reader, a modulator, the modulator being designed to modulate data on the basis of the clock signal from the clock generator, the modulator also being designed to generate a modulation pause by masking out at least one modulation component, the modulation component being smaller than a modulation pulse, and also being designed to send the signal for starting the synchronization mode to the clock generator during this modulation pause.

The signal emitted by the modulator for starting the synchronization mode allows the clock generator to be synchronized, on the basis of a signal received from the reader, even while the transponder unit is in the transmission mode. This can be effected during a modulation pause, for example.

The synchronization of the frequency (clock) of the clock generator firstly aligns the frequency of the clock generator with that of the reader and at the same time prevents a phase shift during modulation.

Furthermore, the modulator in one exemplary embodiment may be designed to send a signal for terminating the synchronization mode to the clock generator.

In a further embodiment, the clock generator is designed to send a signal to the modulator when the synchronization mode has concluded.

The transponder unit according to various embodiments for the contactless transmission of modulated data blocks to a reader has a clock generator for generating a clock signal and for synchronizing the clock signal in a synchronization mode, on the basis of a signal received from the reader, and a modulator, the modulator being designed to modulate data on the basis of the clock signal from the clock generator, and the modulator also being designed to generate a first modulation pause within a first data block by masking out at least one first modulation component, to generate a second modulation pause within a second data block by masking out at least one second modulation component, the position of the first modulation pause in the first data block being different from the position of the second modulation pause in the second data block, and the modulator also being designed to send a first signal for starting the synchronization mode to the clock generator during the first modulation pause and to send a second signal for starting the synchronization mode to the clock generator during the second modulation pause.

In another embodiment, the modulator may be designed to generate a first modulation pause within a first data block by masking out at least one first modulation component and to generate a second modulation pause within a second data block by masking out at least one second modulation component, at least one data block being arranged between the first data block and the second data block without a modulation pause.

In another embodiment, the modulator is designed to set the number of modulation pauses.

In another embodiment, the modulator is designed to set the time between the modulation pauses.

The transponder unit may also have a circuit arrangement, the circuit arrangement being designed to apply an auxiliary carrier signal to the modulator, the clock frequency of the auxiliary carrier being based on the clock signal from the clock generator. The frequency of the auxiliary carrier is generally produced by dividing the frequency of the clock generator. In RFID systems, modulation methods with aux-iliary carriers are used particularly in inductively coupled systems in the frequency ranges 6.78 MHz, 13.56 MHz or 27.12 MHz. For 13.56 MHz systems, an auxiliary carrier frequency of 847 kHz (13.56 MHz/16) or 424 kHz (13.56 MHz/32) is used most of the time, but other divisions are also possible. The use of an auxiliary carrier ensures better data transmission overall.

In this case, the modulator may also have a combinational logic element, the combinational logic element combining the data, the auxiliary carrier signal and the carrier signal to form a modulated data signal, and the modulator being designed to detect a modulation pause in the modulated data signal and to send the signal for starting the synchronization mode to the clock generator during this modulation pause.

In this case, the combinational logic element may be an AND gate and/or an XOR gate, the AND gate not causing a phase change in the modulated carrier, and the XOR gate, in contrast, causing a phase change of 180° in the carrier during a modulation pulse. In various embodiments, the modulation pause may be situated between a first modulation pulse and a second modulation pulse or, in another exemplary embodiment, may be situated between a first modulation block and a second modulation block.

The modulator may also have a combinational logic element, the combinational logic element combining the data, the auxiliary carrier signal and the carrier signal to form a modulated data signal, and the modulator being designed to generate a modulation pause by masking out at least one modulation component and also being designed to send the signal for starting the synchronization mode to the clock generator during this modulation pause. The combinational logic element may be an XOR gate and/or an AND gate in this case.

The clock generator may be a PLL with an integrated oscillator.

In various embodiments, the transponder unit may be an active transponder unit with its own power supply, for example using its own battery. In this case, the power supply/battery may also be arranged outside the transponder unit. For example, the rechargeable battery of a mobile telephone may be used for this purpose.

The transponder unit may be a portable data storage medium, the portable data storage medium being able to be a chip card or a tag.

A system for contactless data transmission may have a reader, the reader being designed to emit a signal, a transponder unit having a clock generator for generating a clock signal and for synchronizing the clock signal in a synchronization mode, on the basis of the signal emitted by the reader, and a modulator, the modulator being designed to modulate data on the basis of the clock signal from the clock generator and to generate a modulation pause by masking out at least one modulation component, and also being designed to send a signal for starting the synchronization mode to the clock generator during the modulation pause.

A method for transmitting data from a transponder unit to a reader, the transponder unit having a clock generator for generating a clock signal and for synchronizing the clock signal and a modulator, may include: sending a signal from the reader to the clock generator, sending the clock signal from the clock generator to the modulator, modulating the data to be transmitted in the modulator on the basis of the clock signal, generating a modulation pause in the modulator by masking out at least one modulation component within a data block, sending a signal for starting the synchronization of the clock signal from the modulator to the clock generator during the modulation pause, and synchronizing the clock signal on the basis of the signal received from the reader.

In various embodiments, the modulator sends a signal for terminating the synchronization to the clock generator.

Furthermore, the method may also include: applying an auxiliary carrier signal to the modulator, the clock frequency of the auxiliary carrier being based on the clock signal from the clock generator, and modulating the data to be transmitted in the modulator on the basis of the clock signal and/or the auxiliary carrier signal.

Figure 1:
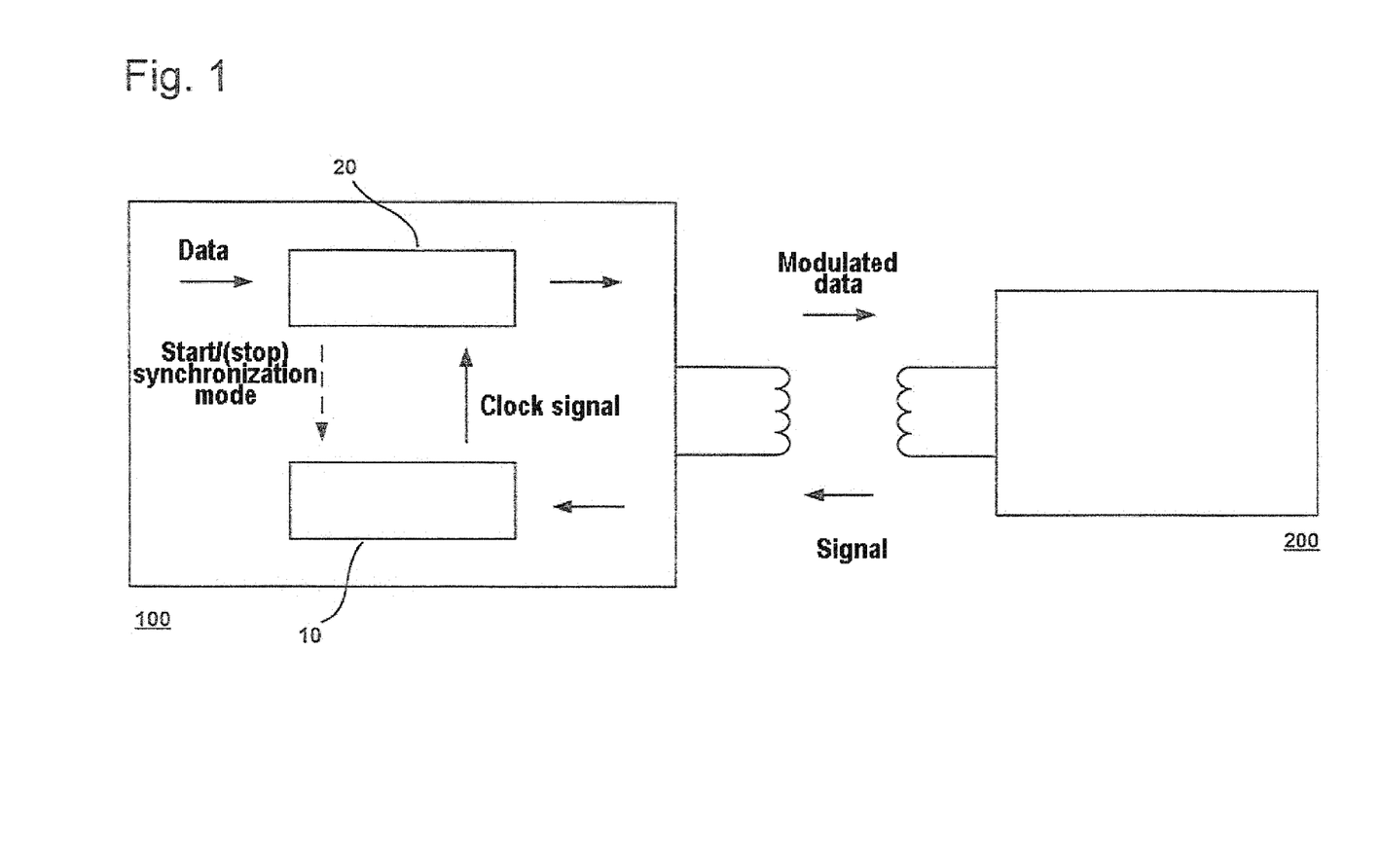
FIG. 1 shows a first embodiment of a transponder unit for contactless data transmission with a reader.

FIG. 1 shows a first embodiment of a transponder unit 100 for contactless data transmission with a reader 200. The transponder unit 100 and the reader 200 together form a system for contactless data transmission. In this case, the data can be transmitted inductively or capacitively.

The reader 200 contactlessly sends a signal which contains a piece of clock information to the transponder unit 100. This signal may be a carrier signal, for example. A customary clock frequency for carrier signals in RFID systems is 13.56 MHz (as per ISO/IEC 14443). The signal is received by the transponder unit 100 and is forwarded to a clock generator 10. The signal is conditioned by the clock generator 10 if necessary and again forwarded as a clock signal to a modulator 20. The modulator 20 uses the clock signal to modulate data, for the purpose of contactless transmission to the reader 200.

In order to ensure a stable clock frequency and phase when the transponder unit 100 is in the transmission mode, that is to say during data transmission from the transponder unit 100 to the reader 200, the modulator 20 sends-for example during a modulation pause-a signal for starting a synchronization mode to the clock generator 10. In this case, the clock generator 10 synchronizes its clock signal with the signal from the reader 200, with the result that even when transmission times in the transponder unit 100 are relatively long a clock discrepancy and hence a disturbance in the data transmission are effectively prevented.

Figure 2:
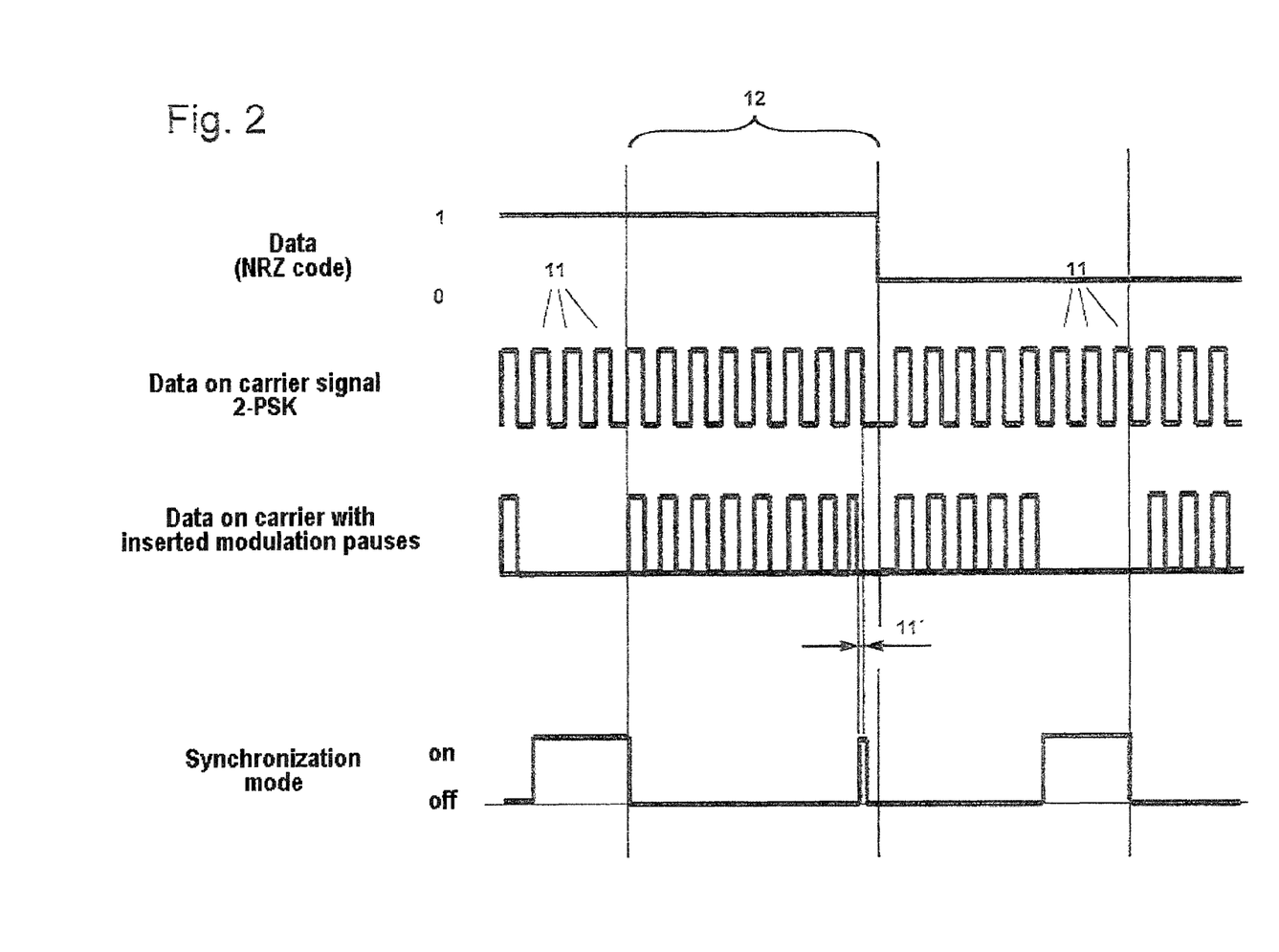
FIG. 2 shows an embodiment of a data carrier signal synchronization mode diagram with a modulation pause for synchronization.

FIG. 2 shows an embodiment of a data carrier signal synchronization mode diagram with pauses for synchronization. In this case, the data are coded using the NRZ code for example. The modulation method shown in this case was the 2-PSK (2-Phase Shift Keying) modulation method. The 2-PSK modulation method involves changeover between the phase states 0° and 180°. Other modulation methods, such as the Manchester code, would likewise be possible in another embodiment. The lower portion of the diagram shows the state "on" or "off" of the synchronization mode.

In the embodiment in FIG. 2, the synchronization takes place during the modulation pauses inserted in a data block 12. In this case, entire modulation pulses 11 or only a modulation component 11' is/are masked out in order to generate the modulation pauses. In this case, the modulation component 11' may be smaller than a modulation pulse 11. In this case, a plurality of modulation pulses 11 are combined to form a data block 12. The starting signal for the synchronization/the synchronization mode is provided for the clock generator 10 by the modulator 20 at the start of the modulation pause. The synchronization then takes place in the modulation pauses. It is possible to have some or all of this synchronization take place in all or some of the modulation pauses. Since the modulation pauses may be relatively short, a fast clock generator 10 with, by way of example, a fast PLL circuit is required.

Figure 3:
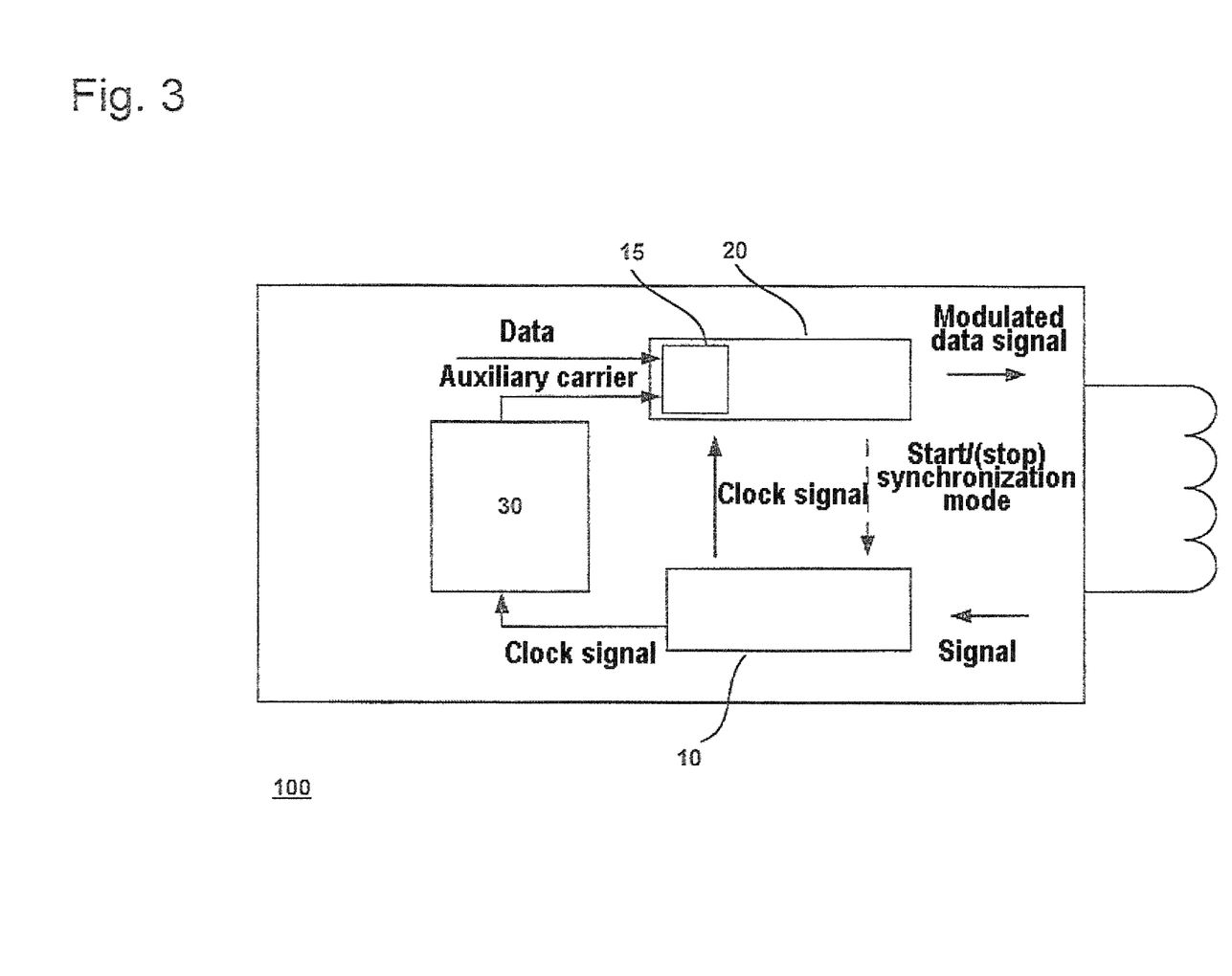
FIG. 3 shows another embodiment of a transponder unit for contactless data transmission.

FIG. 3 shows another embodiment of a transponder unit 100 for contactless data transmission. In this embodiment, the transponder unit 100 also has a circuit arrangement 30.

The circuit arrangement 30 is designed to apply an auxiliary carrier signal to the modulator 20, the clock frequency of the auxiliary carrier being based on the clock signal from the clock generator. The frequency of the auxiliary carrier is generally produced by dividing the frequency of the clock generator. In RFID systems, modulation methods with auxiliary carriers are used particularly in inductively coupled systems in the frequency ranges 6.78 MHz, 13.56 MHz or 27.12 MHz.

For 13.56 MHz systems, an auxiliary carrier frequency of 847 kHz (13.56 MHz/16) or 424 kHz (13.56 MHz/32) is used most of the time, but other divisions are also possible. The auxiliary carrier ensures better data transmission overall.

In the embodiment shown in FIG. 3, the modulator 20 also has a combinational logic element 15, the combinational logic element 15 combining the data, the auxiliary carrier signal and the carrier signal to form a modulated data signal, and the modulator being designed to detect or generate a modulation pause in the modulated data signal and to send the signal for starting the synchronization mode to the clock generator during this modulation pause.

Figure 4:
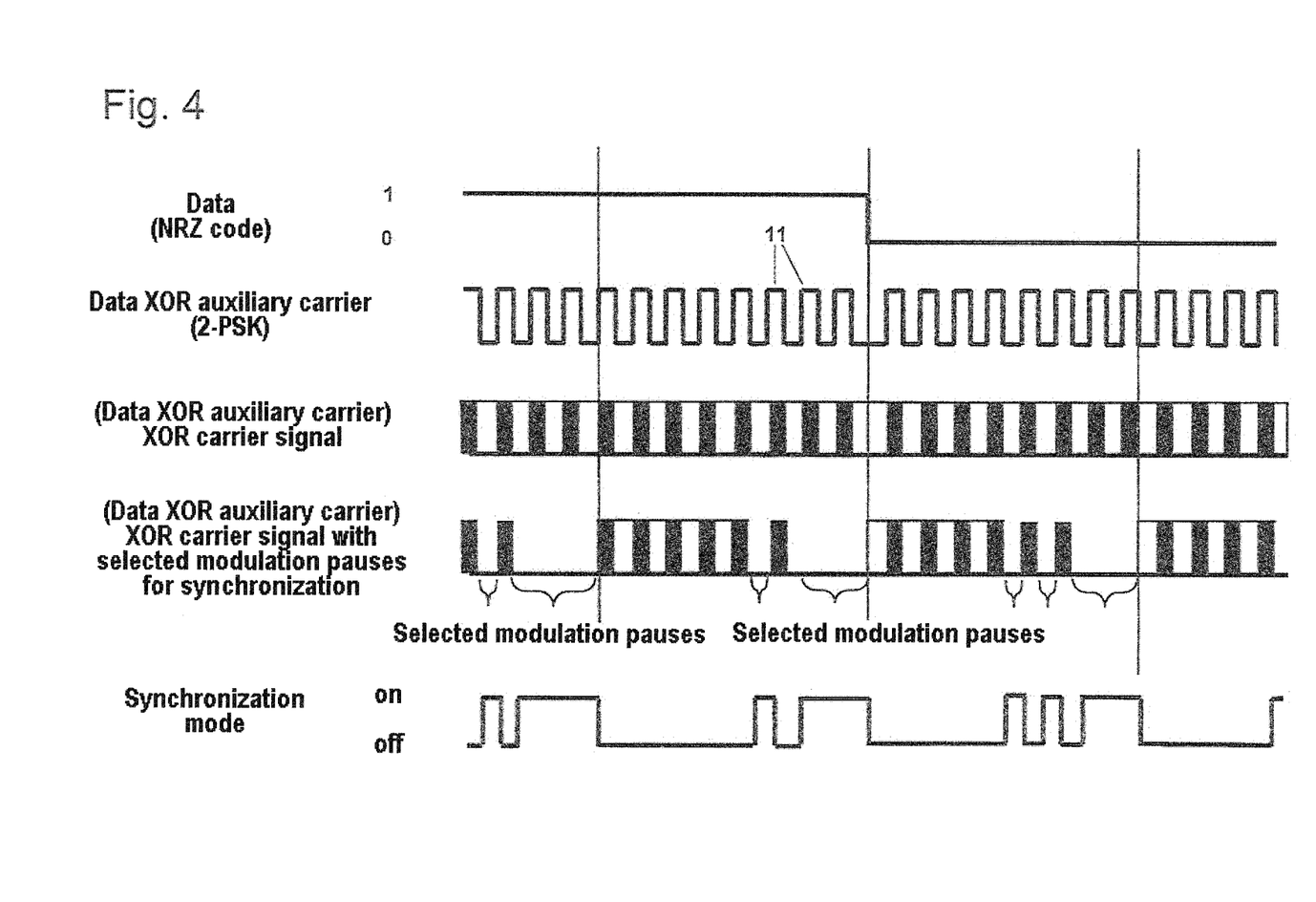
FIG. 4 shows an embodiment of a data (auxiliary) carrier signal synchronization mode diagram with a plurality of inserted pauses for synchronization.

FIG. 4 shows an embodiment of a data (auxiliary) carrier signal synchronization mode diagram, as possible in ISO/IEC 14443-type B, for example, with modulation pauses for synchronization. In this case, the modulator 20 combines data and auxiliary carrier using an XOR function. An XOR function is then used to combine this combination in turn with the carrier signal, with the result that the following combination is produced: (data XOR auxiliary carrier) XOR carrier signal In this case, the data are coded using the NRZ code, for example. The modulation method shown in this case was the 2-PSK modulation method. Other modulation methods, such as the Manchester code, could likewise be used in other embodiments.

In the embodiment in FIG. 4, there are a plurality of modulation pauses for synchronization. In this case, suitable modulation pauses are either detected, for example between two modulation pulses 11. or modulation pauses are deliberately generated, for example by masking out individual modulation pulses 11. Any desired combinations of the embodiments stated above are therefore conceivable. Modulation pauses can be inserted, for example, according to the requirements, for example with respect to the duration and number of modulation modes.

Figure 5:
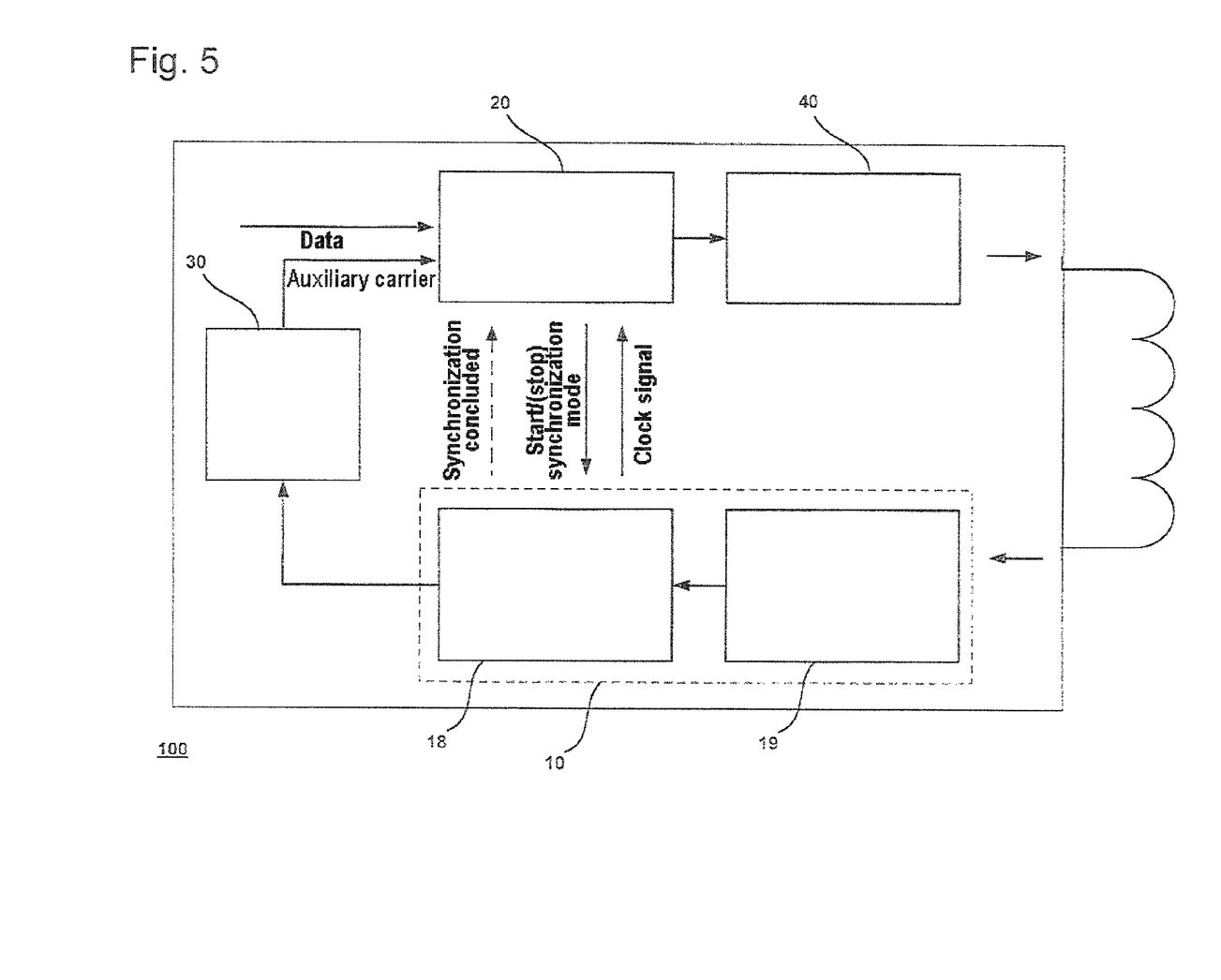
FIG. 5 shows another embodiment of a transponder unit for contactless data transmission.

FIG. 5 shows another embodiment of a transponder unit 100 for contactless data transmission. In this case, a (clock) signal, for example from a reader 200, is extracted by a clock conditioning circuit 19 and forwarded to a PLL with an integrated oscillator 18. The PLL then sends a clock signal, which is based on the received signal, firstly to a logic circuit 30 and secondly to the modulator 20. The logic circuit generates an auxiliary carrier, which is likewise forwarded to the modulator 20. The modulator 20 is designed to start and, if necessary, to stop the synchronization mode by sending an appropriate signal to the PLL 18, if this is necessary, for example on account of an excessive clock discrepency. In return, the PLL 18 can send a signal to the modulator 20 when it is ready for synchronization or when the synchronization has been successfully concluded. The modulated signal from the modulator 20 is then amplified by means of an amplifier 40 and output.

The synchronization intervals and also the duration of the synchronization mode are freely selectable in this case.

Figure 6:
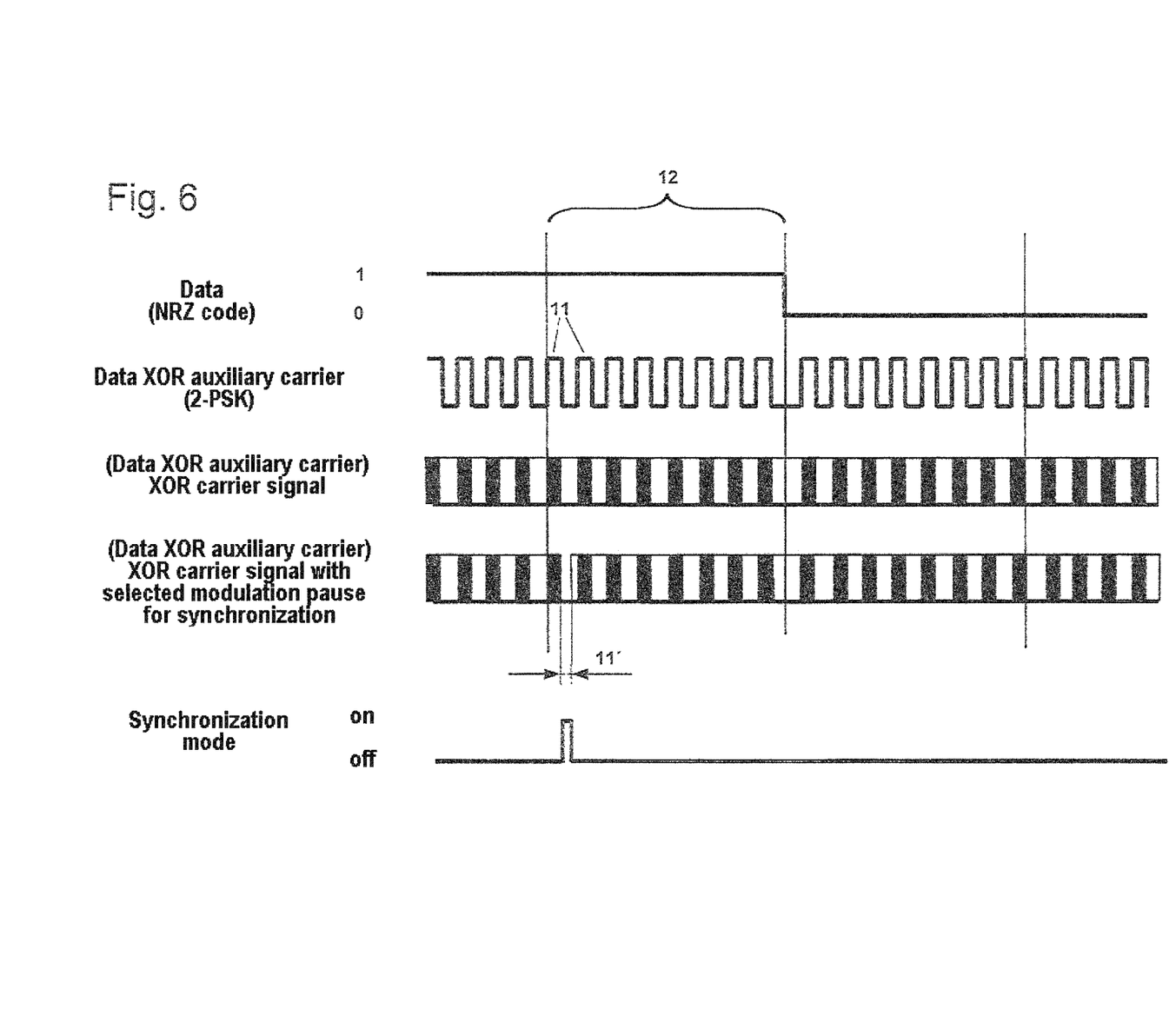
FIG. 6 shows an embodiment of a data (auxiliary) carrier signal synchronization mode diagram with an inserted pause for synchronization.

FIG. 6 shows another embodiment of a data (auxiliary) carrier signal synchronization mode diagram, as possible in ISO/IEC 14443-type B, for example, with an inserted modulation pause for synchronization. In this case, the modulation pause is generated by masking out a modulation component 11', the modulation component 11' being able to be smaller than a modulation pulse 11. In this case, the modulator 20 combines data and auxiliary carrier using an XOR function.

In this case, the data are coded using the NRZ code, for example. The modulation method shown in this case was the 2-PSK modulation method.

Figure 7:
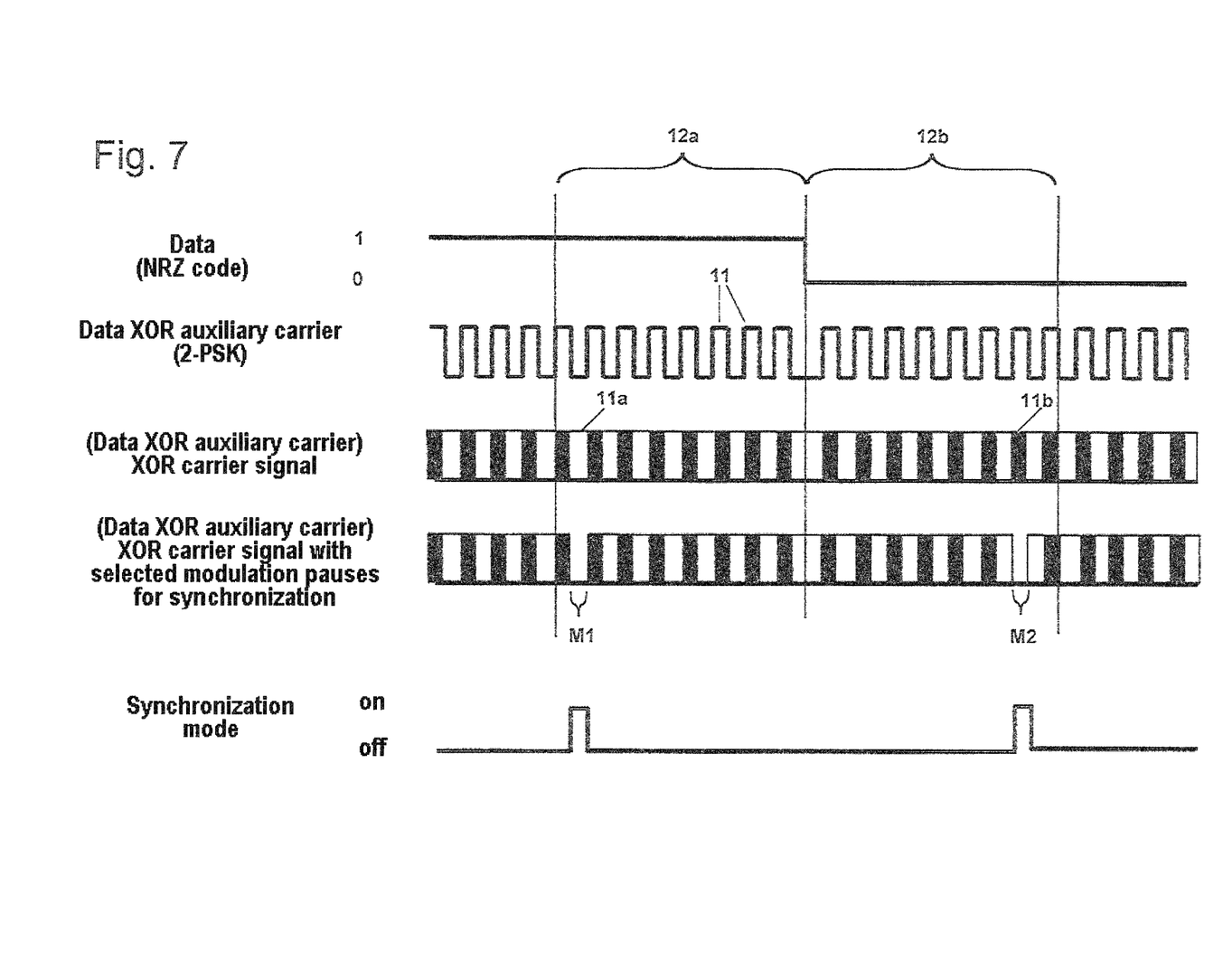
FIG. 7 shows an embodiment of a data (auxiliary) carrier signal synchronization mode diagram with a plurality of inserted pauses for synchronization.

FIG. 7 shows an embodiment of a data (auxiliary) carrier signal synchronization mode diagram with a first modulation pause M1 within a first data block 12a and a second modulation pause M2 within a second data block 12b for synchronization. In this case, the first modulation pause M1 is deliberately generated by masking out at least one first modulation component 11a and the second modulation pause M2 is generated by masking out at least one second modulation component 11b, the position of the first modulation pause M1 in the first data block 12a being different from the position of the second modulation pause M2 in the second data block 12b. The modulator 20 is designed to send a first signal for starting a first synchronization mode to the clock generator 10 during the first modulation pause M1 and to send a second signal for starting a second synchronization mode to the clock generator 10 during the second modulation pause M2. In this case, it is not necessary for the start and the frequency of the modulation pauses M1, M2 to be related to the data blocks 12a, 12b or auxiliary carrier. Any desired combinations of the exemplary embodiments stated above are therefore conceivable. Modulation pauses can be inserted, for example, according to the requirements, for example with respect to the duration and number of modulation modes.

While the invention has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

What is claimed is:

1. A transponder unit for the contactless transmission of modulated data to a reader, the transponder unit comprising:
   a clock generator configured to generate a clock signal and to synchronize the clock signal in a synchronization mode, on the basis of a signal received from the reader;
   a modulator, the modulator configured to modulate data on the basis of the clock signal from the clock generator; wherein the modulator is configured to send a signal for terminating the synchronization mode to the clock generator;
   wherein the modulator is configured to generate a modulation pause by masking out at least one modulation component, the modulation component being smaller than a modulation pulse, and wherein the modulator is further configured to send the signal for starting the synchronization mode to the clock generator during this modulation pause.

2. The transponder unit of claim 1, further comprising:
   a circuit arrangement configured to apply an auxiliary carrier signal to the modulator;
   wherein the clock frequency of the auxiliary carrier is based on the clock signal from the clock generator.

3. The transponder unit of claim 2,
   wherein the modulator further comprises a combinational logic element,
   wherein the combinational logic element combines the data, the auxiliary carrier signal and the carrier signal to form a modulated data signal.

4. The transponder unit of claim 3,
   wherein the combinational logic element is at least one of an XOR or an AND gate.

5. The transponder unit of claim 1,
   wherein the clock generator is a phase locked loop with an integrated oscillator.

6. The transponder unit of claim 1,
   wherein the transponder unit is an active transponder unit with its own power supply.

7. The transponder unit of claim 1, wherein the modulator is configured to generate a modulation pause within a data block, and wherein the modulation pause occurs between a first modulation pulse and a second modulation pulse within a modulation block or within the data block.

8. A transponder unit for the contactless transmission of modulated data blocks to a reader, the transponder unit comprising:
   a clock generator configured to generate a clock signal and to synchronize the clock signal in a synchronization mode, on the basis of a signal received from the reader;
   a modulator configured to modulate data on the basis of the clock signal from the clock generator; wherein the modulator is configured to send a signal for terminating the synchronization mode to the clock generator;
   wherein the modulator is configured to generate a first modulation pause within a first data block by masking out at least one first modulation component, to generate a second modulation pause within a second data block by masking out at least one second modulation component, the position of the first modulation pause in the first data block being different from the position of the second modulation pause in the second data block, and
   wherein the modulator is further configured to send a first signal for starting the synchronization mode to the clock generator during the first modulation pause and to send a second signal for starting the synchronization mode to the clock generator during the second modulation pause.

9. The transponder unit of claim 8,
   wherein at least one data block is arranged between the first data block and the second data block without a modulation pause.

10. The transponder unit of claim 8,
    wherein the modulator is configured to set the number of modulation pauses.

11. The transponder unit of claim 8,
    wherein the modulator is configured to set the time between the modulation pauses.

12. A portable data storage medium, comprising:
    a transponder unit, comprising:
       a clock generator configured to generate a clock signal and to synchronize the clock signal in a synchronization mode, on the basis of a signal received from the reader;
       a modulator, the modulator configured to modulate data on the basis of the clock signal from the clock generator; wherein the modulator is configured to send a signal for terminating the synchronization mode to the clock generator;

wherein the modulator is configured to generate a modulation pause by masking out at least one modulation component, the modulation component being smaller than a modulation pulse, and wherein the modulator is further configured to send the signal for starting the synchronization mode to the clock generator during this modulation pause.

13. The portable data storage medium as claimed in claim 12,
wherein the portable data storage medium is a chip card or a tag.

14. A system for contactless data transmission, comprising:
a reader configured to emit a signal;
a transponder unit comprising a clock generator configured to generate a clock signal and to synchronize the clock signal in a synchronization mode, on the basis of the signal emitted by the reader, and a modulator, the modulator being configured to modulate data on the basis of the clock signal from the clock generator and to generate a modulation pause by masking out at least one modulation component, and also being configured to send a signal for starting the synchronization mode to the clock generator during this modulation pause;
wherein the modulator is configured to send a signal for terminating the synchronization mode to the clock generator.

15. A method for transmitting data from a transponder unit to a reader, the transponder unit having a clock generator configured to generate a clock signal and to synchronize the clock signal and a modulator, the method comprising:
sending a signal from the reader to the clock generator;
sending the clock signal from the clock generator to the modulator;
modulating the data to be transmitted in the modulator on the basis of the clock signal;
generating a modulation pause in the modulator by masking out at least one modulation component within a data block;
sending a signal for starting the synchronization of the clock signal from the modulator to the clock generator during the modulation pause;
sending a signal for terminating the synchronization mode to the clock generator; and
synchronizing the clock signal on the basis of the signal received from the reader.

16. The method as claimed in claim 15,
wherein the modulator sends a signal for terminating the synchronization to the clock generator.

* * * * *